(12) United States Patent
Joern et al.

(10) Patent No.: US 9,637,213 B2
(45) Date of Patent: May 2, 2017

(54) SHELL SEGMENT OF AN AIRCRAFT AND A PRODUCTION METHOD

(71) Applicant: Airbus Operations GmbH, Hamburg (DE)

(72) Inventors: Paul Joern, Hamburg (DE); Markus Mueller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 277 days.

(21) Appl. No.: 14/287,625

(22) Filed: May 27, 2014

(65) Prior Publication Data

US 2014/0377501 A1    Dec. 25, 2014

(30) Foreign Application Priority Data

May 28, 2013 (EP) .................................... 13169429

(51) Int. Cl.
| | | |
|---|---|---|
| *B64C 1/12* | (2006.01) | |
| *B64C 1/06* | (2006.01) | |
| *B29C 65/48* | (2006.01) | |
| *B29C 65/56* | (2006.01) | |

(Continued)

(52) U.S. Cl.
CPC ................ *B64C 1/06* (2013.01); *B29C 65/48* (2013.01); *B29C 65/562* (2013.01); *B29C 65/62* (2013.01);
(Continued)

(58) Field of Classification Search
CPC ....................................................... B64C 1/12
(Continued)

(56) References Cited

U.S. PATENT DOCUMENTS 3,071,217 A * 1/1963 Gould ...................... B64C 1/40
244/119
4,786,343 A 11/1988 Hertzberg
(Continued)

FOREIGN PATENT DOCUMENTS

| DE | 102009060706 | 6/2011 |
|---|---|---|
| EP | 0758607 | 2/1997 |

(Continued)

OTHER PUBLICATIONS

Machine translation of French 2804975 retrieved Feb. 3, 2016.*
European Search Report, Oct. 9, 2013.

*Primary Examiner* — Alexander Thomas
(74) *Attorney, Agent, or Firm* — Greer, Burns & Crain, Ltd.

(57) ABSTRACT

A segment and a method for producing such a segment, in particular for an aircraft, having a skin field and a skin field stiffening structure. The skin field and stiffening structure are made from fiber-reinforced plastic materials. The stiffening structure is bonded to an inner surface of the skin field and comprises a multiplicity of first stiffeners and mounts which are formed integrally with the first stiffeners and extend in a transverse direction of the first stiffeners for the connection of second stiffeners to form an integral lattice structure. Reinforcement elements are provided for mechanically fixing the mounts to the skin field. Each reinforcement element has a connection section and a blocking section having an extension in a direction inclined to the connection section. The connection section penetrates the skin field and the mounts, and the blocking section is in contact with an outer surface of the skin field.

10 Claims, 3 Drawing Sheets

(51) Int. Cl.
  *B29C 65/62* (2006.01)
  *B29C 65/72* (2006.01)
  *B29C 65/00* (2006.01)
  *B29C 70/24* (2006.01)
  *B29D 99/00* (2010.01)
  *B32B 7/08* (2006.01)
  *B32B 37/00* (2006.01)
  *B29L 31/30* (2006.01)
  *B64C 1/00* (2006.01)
  *B32B 38/00* (2006.01)

(52) U.S. Cl.
  CPC .......... *B29C 65/72* (2013.01); *B29C 66/1122* (2013.01); *B29C 66/474* (2013.01); *B29C 66/721* (2013.01); *B29C 70/24* (2013.01); *B29D 99/0014* (2013.01); *B32B 7/08* (2013.01); *B32B 37/00* (2013.01); *B64C 1/12* (2013.01); *B29C 66/7212* (2013.01); *B29C 66/72141* (2013.01); *B29C 66/73752* (2013.01); *B29L 2031/3076* (2013.01); *B32B 2038/008* (2013.01); *B32B 2038/0052* (2013.01); *B64C 2001/0072* (2013.01); *Y02T 50/433* (2013.01); *Y10T 428/24281* (2015.01)

(58) Field of Classification Search
  USPC .......................... 428/119, 223; 244/119, 131
  See application file for complete search history.

(56) References Cited

U.S. PATENT DOCUMENTS

| | | | |
|---|---|---|---|
| 5,735,486 | A | 4/1998 | Piening et al. |
| 5,827,383 | A | 10/1998 | Campbell et al. |
| 7,205,066 | B1 | 4/2007 | Hammi et al. |
| 7,997,534 | B2 | 8/2011 | Eberth |
| 2003/0190455 | A1 | 10/2003 | Burgess et al. |
| 2004/0213953 | A1 | 10/2004 | Brantley et al. |
| 2006/0060705 | A1 | 3/2006 | Stulc et al. |
| 2007/0108347 | A1 | 5/2007 | Sankrithi et al. |
| 2008/0283664 | A1* | 11/2008 | Calamvokis ............ B64C 1/061 244/119 |
| 2009/0283638 | A1 | 11/2009 | Arevalo et al. |
| 2011/0143085 | A1 | 6/2011 | Blot et al. |
| 2011/0186683 | A1 | 8/2011 | Lonsdorfer et al. |
| 2011/0287208 | A1* | 11/2011 | Velicki ................. B29C 70/443 428/69 |

FOREIGN PATENT DOCUMENTS

| | | |
|---|---|---|
| FR | 2804975 | 8/2001 |
| JP | H03 297629 | 12/1991 |
| WO | 0220248 | 3/2002 |
| WO | 2010012960 | 2/2010 |

* cited by examiner

SHELL SEGMENT OF AN AIRCRAFT AND A PRODUCTION METHOD

CROSS-REFERENCES TO RELATED APPLICATIONS

This application claims the benefit of the European patent application No. 13 169 429.1 filed on May 28, 2013, the entire disclosures of which are incorporated herein by way of reference.

BACKGROUND OF THE INVENTION

The invention concerns a shell segment of an aircraft and method for producing such a shell segment.

Shell segments such as fuselage segments in aircraft construction consist in general of a skin field and a backing structure for purposes of stiffening the skin field. The backing structure conventionally has a multiplicity of longitudinal stiffeners, which are arranged directly on the skin field, and a multiplicity of circumferential stiffeners, which are connected to the skin field by means of mounts, e.g., clips, and in addition are supported on the longitudinal stiffeners by means of supporting elements, e.g., cleats.

The manufacture of shell segments of this type takes place either in a differential form of construction, or in an integral form of construction. In the differential form of construction, the individual components are produced separately from one another, and are subsequently joined to form the total module. Such differential form of construction requires a multiplicity of connecting elements to connect the components together. The integral form of construction, which is shown, for example, in US 20070108347, and in which the individual components are integrally produced as a total module, is distinguished by a reduced level of assembly resource and by a low weight as a result of the use of fiber-reinforced composite materials.

In DE 102009060706 A1 a combination of both constructions is shown. Hereby, an integral backing structure and an integral skin field are produced separately from each other and joint afterwards by bonding, for instance.

In U.S. Pat. No. 5,827,383 a stiffener reinforced assembly is shown comprising a composite skin field and a composite stiffener element. The stiffener element is bonded to the skin field and additionally fixed by rod-like reinforcement elements to the skin field.

Further prior art is known from EP 0758607 A2, FR 2804975, U.S. Pat. No. 7,205,066 B1, WO 0220248 A1, US 20030190455 A1 and U.S. Pat. No. 7,997,534 B2.

SUMMARY OF THE INVENTION

An object of the present invention comprises creating a shell segment of an aircraft having a stiffening structure that is reliable fixed to a skin field of the shell segment. Further on, it is an object of the present invention to create a method for producing such a shell segment.

According to the invention, a shell segment of an aircraft has a skin field and a stiffening structure for purposes of stiffening the skin field. The skin field and the stiffening structure are made from fiber reinforced plastic materials. The stiffening structure is bonded to an inner surface of the skin field and comprises a multiplicity of first stiffness and a multiplicity of mounts which are formed integrally with a the first stiffeners and which extend in the transverse of the first stiffener for the connection of second stiffeners. According to the invention, a multiplicity of reinforcement elements for fixing the mounts mechanically to the skin fields are provided, wherein each reinforcement element has a connection section and a blocking section having an extension in a direction inclined to the connection section. A connection section penetrates the skin field and the mounts, wherein the blocking section is in contact with an outer surface of the skin field.

The shell segment in accordance with the invention combines the advantages of the differential form of construction with those of the integral form of construction, such that the stiffening structure as a whole can be connected to the skin field with reduced assembly resource. The reduced assembly resource, however, does not have a disadvantageous outcome on the production resource for the total module, since the stiffening structure and the skin field are manufactured separately from one another, such that the method in accordance with the invention has a reduced level of integration, and thus a reduced production resource and an increased level of process reliability, compared with the conventional integral form of construction. Moreover, the total number of individual components necessary is greatly reduced, since the stiffening structure is no longer connected to the skin field as individual parts, but as one module. Furthermore an improved level of access and a simplified stock of components are achieved. In particular, inspection of the stiffening structure is simplified, since the first stiffeners can be inspected from all sides, that is to say from underneath also, or in the case of Omega-shaped stiffeners, also internally.

In particular due to the fiber-reinforced plastic materials, the formation of the stiffeners can be locally modified, for example by means of additional reinforcement fibers, or by means of a different orientation of the fibers, such that individual sections of the stiffening structure are optimally matched to locally-occurring loadings. As a result of the integration of the mounts into the stiffening structure, the number of parts and steps in the assembly are further reduced. Similarly, the number of production forming elements, such as pressure pieces, is further reduced. The positioning accuracy is further increased, and the assembly of the second stiffeners, or ribs, is greatly simplified, since by means of the mounts a so-called rib track is specified exactly, and subsequent labor-intensive adjustment tasks during the connection of the second stiffeners can be eliminated. The use of washers, or spacers, i.e., what is called "shimming," for purposes of tolerance compensation is eliminated.

Due to the inclined blocking sections of the reinforcement elements in the case of a stress peak acting on the mounts, the reinforcement elements cannot be pulled through the skin field. Thus, the bonding of the stiffener structure is locally supported and a collapse of the shell segment is reliable prevented.

In a preferred embodiment, each reinforcement element has a pin-like shape with a shaft as connection section and a radially extended head having a larger diameter than the connection shaft as blocking section. Such reinforcement elements are easy to install and can be made from metal such as titanium or from reinforced plastic materials such as CFRP. In an alternative embodiment, the reinforcement element has an L-like shape, wherein the blocking section is a angled section having the same diameter as the connection section. Further on, in one embodiment, the reinforcement elements are U-shaped pins having two parallel connection sections and one blocking section for connecting the connection sections.

In order to avoid any negative impact on the aerodynamics of the aircraft by the blocking sections of the reinforcement elements, the blocking sections of the reinforcement elements can be positioned in recesses of the outer surface of the skin field.

In an alternative embodiment, each reinforcement element has a filament-like shape with a straight section as connection section and an angled section as blocking section. The filament can be a fiber filament or a metal filament such as a wire. The filament-like construction enables a creation of a plurality of reinforcement elements simultaneously.

In one embodiment, the filament-like reinforcement elements are positioned in crossed rows. By this measure, the mounts can be penetrated over their whole extension transverse to the row orientation, i.e., width, thus enhancing the mechanical fixation.

Preferably, the blocking sections of the crossed rows face away from each other. Hereby, a maximum angle between the blocking sections and the connection sections can be achieved which has a positive impact on the load path through the reinforcement elements. In one alternative embodiment, the filament-like reinforcement elements are led straight into the mount flange.

In order to protect the blocking sections of the reinforcement elements and/or in order to enhance the aerodynamics characteristics of the shell segment, a cover layer can be attached to the outer surface of the skin field after the setting of the reinforcement elements.

In a method in accordance with the invention, in particular for purposes of building a shell segment according to the invention, an integral stiffening structure is manufactured from fiber-reinforced plastic materials, with a multiplicity of first stiffeners and integral mounts extending transverse to the first stiffeners. Then, a skin field made from fiber reinforcement plastic materials is provided. After that, the stiffening structure is bonded to an inner surface of the skin field. Then, the mounts are fixed mechanically to the skin field by reinforcement elements, wherein the reinforcement elements penetrate the skin field and the mounts and are in contact with an outer surface of the skin field.

The method enables an easy manufacture of a shell segment having a very high resistance against load peaks acting on the stiffening structure and in particular on the mounts. The mechanical fixation of the mounts can be done before, during or after the bonding of the stiffening structure to the skin field. Furthermore, the method in accordance with the invention by virtue of the reduced production resource and the high level of process reliability allows a high batch size and thus a high rate of production.

In a preferred embodiment, the reinforcement elements are inserted from the outer surface of the skin field. In particular, if the reinforcement elements have pin-like shapes, they can be easy installed by nailing, for instance, until their blocking sections are in contact with the outer surface of the skin field.

In an alternative embodiment, in order to create a multiplicity of reinforcement elements simultaneously, the reinforcement elements are sewed our tufted filaments or wires, wherein filament loops on the outer surface of the skin filed are created and are tilt against the outer surface. Thereby, the loops on the outer surface of the skin field can be cut through. Preferably in order to fully disconnect adjacent reinforcement elements, inner filament loops, i.e., loops on the mount side of the shell segment are cut through as well.

BRIEF DESCRIPTION OF THE DRAWINGS

In what follows preferred examples of embodiment of the present invention are elucidated in more detail with the aid of simplified schematic representations. In the figures.

DETAILED DESCRIPTION OF THE PREFERRED EMBODIMENTS

Figure 1:
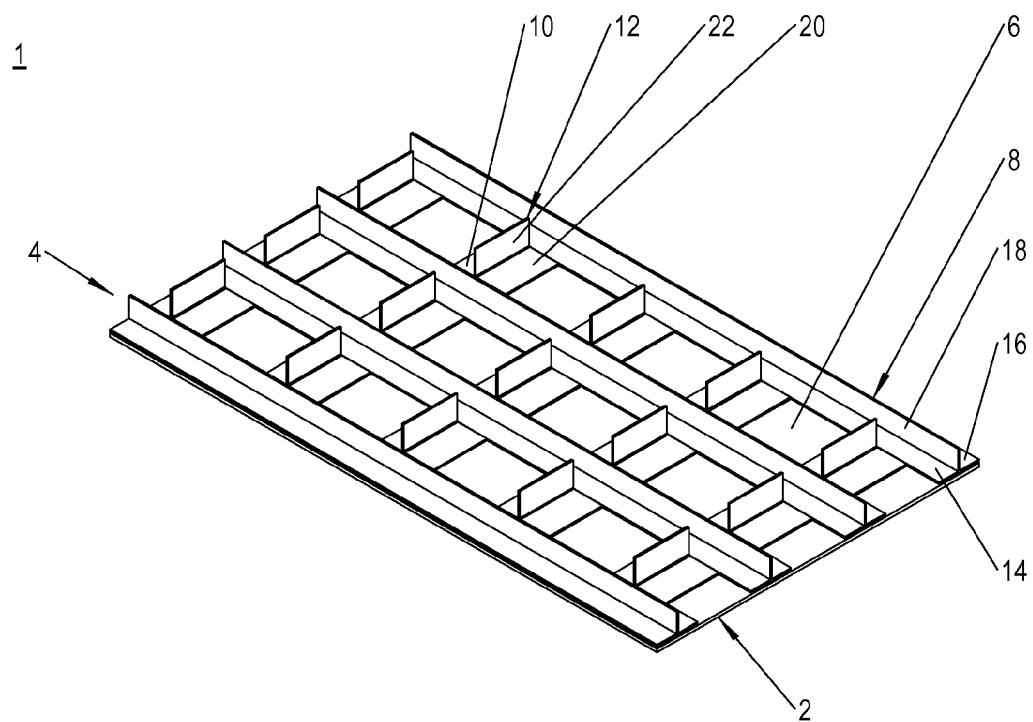
FIG. 1 shows a prospective view of a segment in accordance with the invention.

According to FIG. 1, a segment 1 in accordance with the invention has a skin field 2 and a lattice shaped stiffening structure 4. In the shown embodiment, the segment 1 is a shell segment and in particular a fuselage segment of an aircraft fuselage. However, the invention is not limited to a fuselage sections and can also be an aircraft wing segment, for instance.

The skin field 2 is an integral composite part and in particular made from fiber reinforced plastic materials such as CFRP. Due to drawing reasons, the skin field 2 is shown has a flat shaped element instead of a spherical shape element.

The stiffening structure 4 is also an integral composite part and in particular made from fiber reinforced plastic materials such as CFRP. It is used for stiffening the skin field 2 and positioned on an inner surface 6 of the skin field 2. It is bonded to the inner surface 6 and consists of a multiplicity of first stiffeners 8, cross-ties 10 and mounts 12, respective clips.

In the shown embodiment, the stiffeners 8 are aligned parallel to each other. They are orientated in longitudinal direction of the skin field 2. In the shown embodiment, the stiffeners are T-shaped particular stringers. They have in each case in accordance with the shown embodiment two feet 14, 16 for purposes of connection to the skin field 2, and a web 18 extending orthogonally from the feet 14, 16 and thus orthogonally from the skin field 2. However, the first stiffeners 8 are not limited to T-shaped stringers. They can also be Omega-shaped as well, for instance.

The cross-ties 10 are used to connect the adjacent stiffeners 8. They extend in transverse direction between the stiffeners 8. They have a flat shape and are bonded to the skin field 2 as well. In particular, they extend between the feet 14, 16 of two adjacent stiffeners 8 and spaced apart from each other in longitudinal direction of the skin field 2. The cross-ties 10 have a flat shape and are bonded to the skin field 2 as well.

Figure 2:
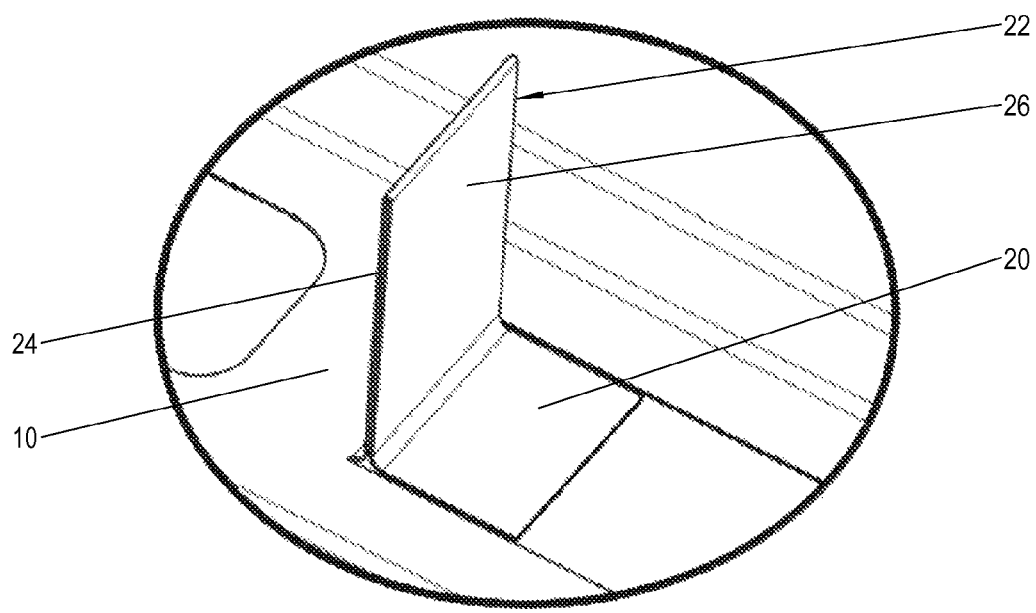
FIG. 2 shows an enlarged mount of a stiffener structure of the segment.

The mounts 12 are designed integrally with the stiffeners 8 and the cross-ties 10. They define in each case a track for purposes of aligning and connecting not shown second stiffeners, i.e., frames or ribs, running in circumferential direction of the fuselage to be built, for instance. The mounts 12 have in each case a profile with a foot 20 for purposes of connection to the skin field 2 and a flange 22 extending orthogonally from the foot 20 and thus orthogonally from the skin field 2 for purposes of attaching the second stiffeners. As shown in FIG. 2, the mounts 12 are folded skin field layer portions. Thus, each mount 12 consists of at least two flange layers 24, 26 which are bonded together on their surfaces facing to each other.

Figure 3:
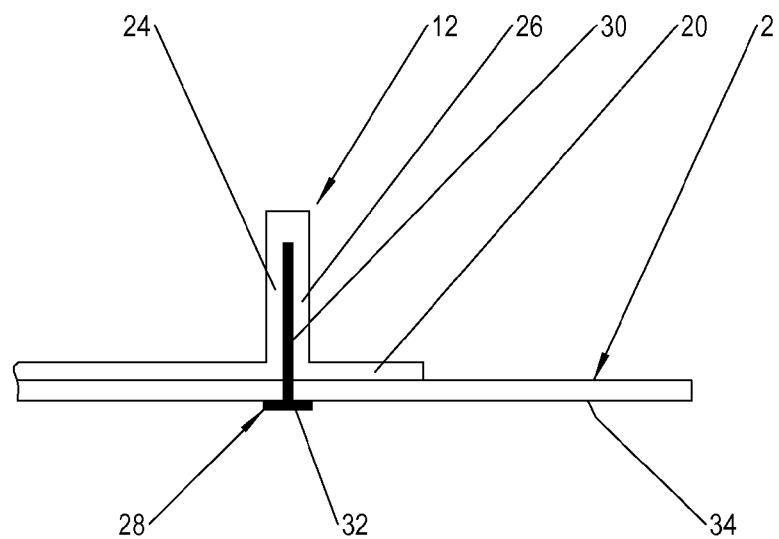
FIG. 3 is a cross section of the segment in the area of a mount according to one embodiment of the invention.

In accordance with FIG. 3, beside the bonding connection the mounts 12 are also fixed mechanically to the skin field 2. For this purpose, a multiplicity of reinforcement elements 28 is provided. In the shown embodiment, the reinforcement elements 28 are rigid pins made from a metal such as titanium or from fiber-reinforced plastic materials such as CFRP. At least one reinforcement element 28 is provided for mechanical fixation of one mount 12. Preferably, one mount 12 is mechanically fixed by several reinforcement elements 28, which are aligned to each other in a row.

According to a first embodiment of a mechanical mount fixation shown in FIG. 3, each reinforcement element 28 has a shaft or connection section 30 and a head or blocking section 32.

The connection section 30 has a longitudinal shape and a constant diameter. In order to enhance a mechanical connection and in particular to create a form fit between the reinforcement element 28 and the mounts 12, the connection section 30 can be provided with recesses and/or teeth. The connection section 30 can also be provided with thread.

The blocking section 32 has an extension in a transverse direction to the connection section 30. In particular, the blocking section 32 is radially extended in relation to the connection section 30 and thus has a bigger diameter than the connection section 30.

The reinforcement elements 28 are penetrating the skin field 2 from an outer surface 34 and are inserted in the mounts 12, in particular between their flange layers 24, 26. The reinforcement elements 28 have the same orientation from skin field 2 as the mounts 12 and abut with their blocking sections 32 against the outer surface 34 of the skin field 2. Thus, due to the broadened blocking sections 32 being in contact with the outer surface 34, the reinforcement elements 28 cannot be pulled through the skin field 2 in the case of an unexpected high load acting for instance off-plane on the mounts 12. As a consequence, a collapse of the mount bonding and thus a local disconnection of the stiffener structure 4 from the skin field 2 are reliably prevented.

Figure 4:
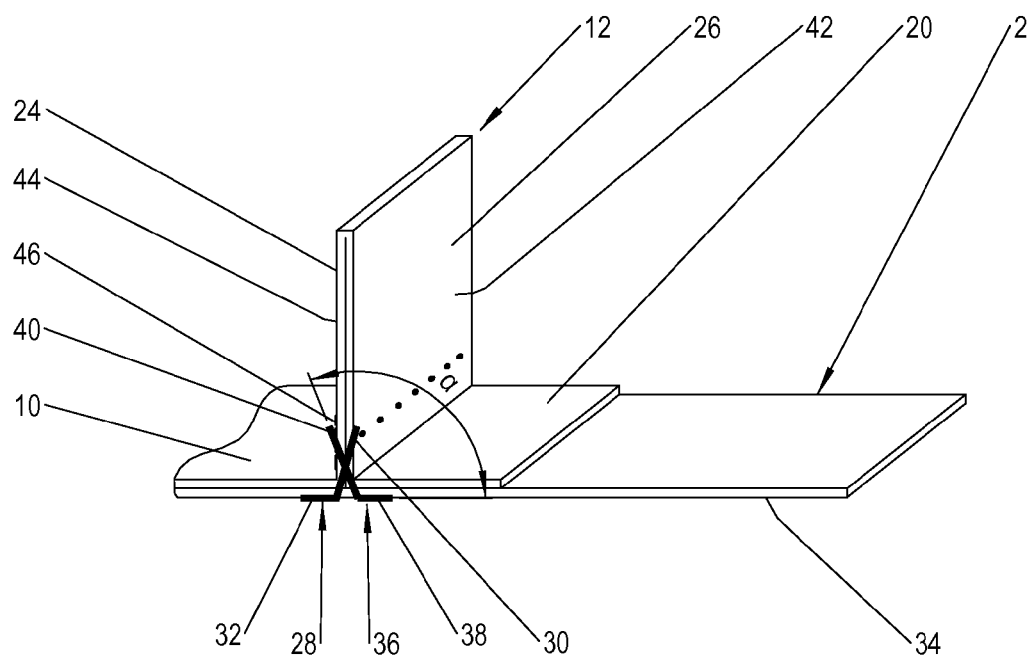
FIG. 4 is a prospective view of the segment in the area of a mount according to another embodiment of the invention.

In FIG. 4, a second embodiment of the mechanical mount fixation is shown. In this embodiment, firstly two parallel rows of reinforcement elements 28, 36 are shown. In particular, the rows are positioned crosswise to each other. Secondly, the reinforcement elements 28, 36 are adjacent filaments that penetrate the skin field 2 and the mounts 12. The filaments and thus the reinforcement elements 28, 36 are carbon fibers or glass fibers, for instance, or a metal wire.

The reinforcement elements 28, 36 penetrate the skin field 2 in the area of the mounts 12 and the flange layers 24, 26 of the mounts 12. They have a L-shape geometry with a straight section as connection sections 30, 40 and an angle sections as blocking sections 32, 38.

The connection sections 30, 40 are inclined to the skin field 2 in an angle different than 90°, although the mounts 12 extend orthogonally from the skin field 2. Due to the crosswise orientation of the reinforcement element rows, the connection sections 30, 40 of each row ends in one of the flange layer 24, 26, as illustrated by the dots in FIG. 4.

The blocking sections 32, 38 are inclined to the connection sections 30, 40 and are in contact with an outer surface 34 of the skin field 2. They are orientated in such a way to each other that they show in different directions. In the shown embodiment they face away from each other. Hereby, an angle $\alpha$ between the connection sections 30, 40 and the respective blocking section 32, 38 is maximized. In particular, the angle $\alpha$ is greater than 90°. However, the blocking sections 32, 38 can also face to each other, for example.

Preferably, the blocking sections 32, 38 are not shown disconnected loop portions, in particular loop halves, of adjacent reinforcement elements 28, 36 of one row. In particular, if a row of reinforcement elements 28, 36 is created by sewing or tufting as explained below, outer loops on the skin field side, which originally connect adjacent connection sections 30, 40, can be cut through for forming the blocking sections 32, 38. Not shown inner loops on the mount side are preferably cut away in such a way that the reinforcement elements 28, 36 ends flush with opposite surfaces 42, 44 of the flange layers 24, 26, as also illustrated by the dots in FIG. 4 and by the broken cutting line 46.

In a preferred embodiment, the integral lattice shaped stiffening structure 4 and the skin field 2 are provided. They are produced separately from each other and joint afterwards.

Both the stiffening structure 4 and the skin field 2 are made from fiber reinforcement plastic material. Preferred fiber-reinforced composite materials are dry knitted or woven materials, impregnated semi-finished materials such as prepreg and similar.

Then, the stiffening structure 4 and the skin field 2 are positioned on a mold. In order to keep the outer surface 34 of the skin field 2 easily accessible, the mold is preferably a male-mold. Thus, first, the stiffening structure 4 is positioned on the mold, wherein the stiffeners 8 and mounts 12 are received in mold recesses, and second the skin field 2 is positioned with its inner surface 6 on the feet 14, 16, 20 and the cross-ties 10 of the stiffening structure 4. After the positioning, the skin field 2 is bonded to the stiffening structure 4. Additionally the mounts 12 are fixed mechanically to the skin field 2 by reinforcement elements 28, 36 wherein the reinforcement elements 28, 36 penetrate the skin field 2 and the mounts 12 with their connection sections 30, 40 and abut with their blocking section 32, 38 against the outer surface 34 of the skin field 2.

According to FIG. 3, if the reinforcement elements 28 are pins, they can be inserted after the bonding of the stiffening structure 4 to the skin field 2. In particular, the reinforcement elements 28 can be installed independent from a curing state of the stiffener structure 4 and/or the skin field 2, as they can be set by nailing, for instance or by screwing, if the connection sections 30 are provided with an adequate thread. In order to avoid aerodynamics turbulences on the outer surface 34, not shown recesses for the blocking sections 32 are formed into the outer surface 34.

According to FIG. 4, if the reinforcement elements 28, 36 are rovings/filaments, they are made by sewing and tufting respectively. Preferably, the filaments 28, 36 are made from the same material as the skin field 2 and/or the mounts 12. For example, if the skin field 2 and the mounts 12 are made from CFRP, it is preferred if the filaments are made from CFRP as well.

In order to facilitate the sewing or tufting, it is preferred when both the skin field 2 and the stiffening structure 4 are in an uncured state. Thus, the mechanical fixation of the mounts 12 is done simultaneously with the bonding. After the insertion of the reinforcement elements 28, 36, their loops on the skin field site and the loops on the mounts side are cut through. Thereby, the loop portions on the skin field site are pressed against the outer surface 34, wherein the loops on the mount side are removed completely such that the reinforcement elements 28, 36 ends flush with the opposite surfaces 42, 44 of the flange layers 24, 26, as illustrated by the dots in FIG. 4 and by the broken cutting line 46. However the connection sections 30, 40 can also be led on the opposite surfaces 42, 44 of the flange layers 24, 26 as well. After the installation of the filament-like reinforcement elements 28, 36 the skin field 2, the stiffening structure 4 and the reinforcement elements 28, 36 are cured together.

Figure 5:
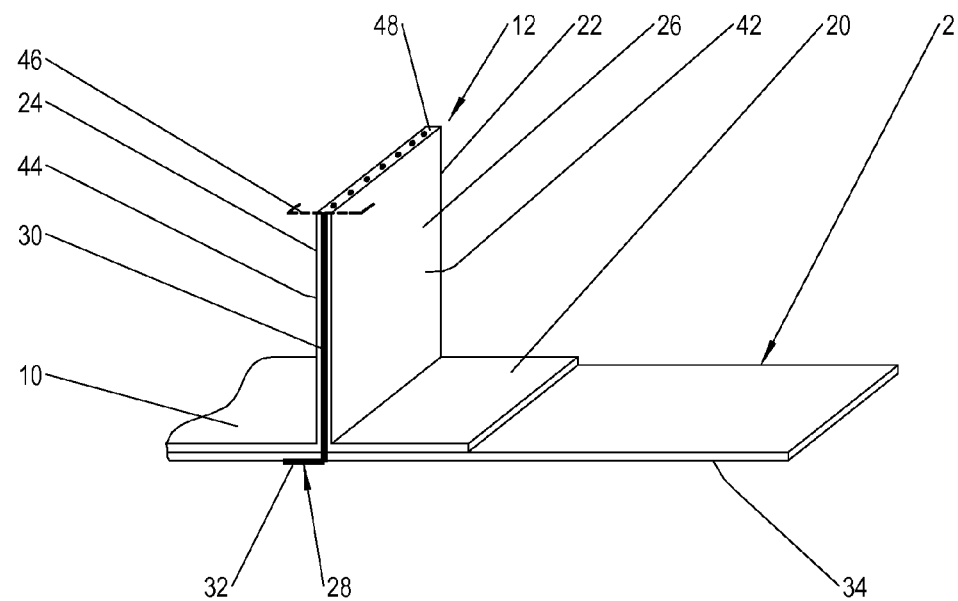
FIG. 5 is a prospective view of the segment in the area of a mount according to a further embodiment of the invention.

As shown in the embodiment according to FIG. 5, the reinforcement elements 28 made from rovings/filaments can also be led with their connection sections 30 straight through a flange 22 of the mounts 12. In this embodiment it is preferred, if the filaments 28 end flush with a narrow surface 48 extending between the opposite surfaces 42, 44 of the mount 12 and facing away from the outer surface 34 of the skin field 2. The flush ending of each connection section 30 is indicated by the broken cutting line 46. In order to balancing the load introduced into the skin field 2 by forces acting on the mounts 12 the blocking sections 32 can be positioned alternating to each other in such a way that adjacent blocking sections 32 are showing in opposite directions.

Figure 6:
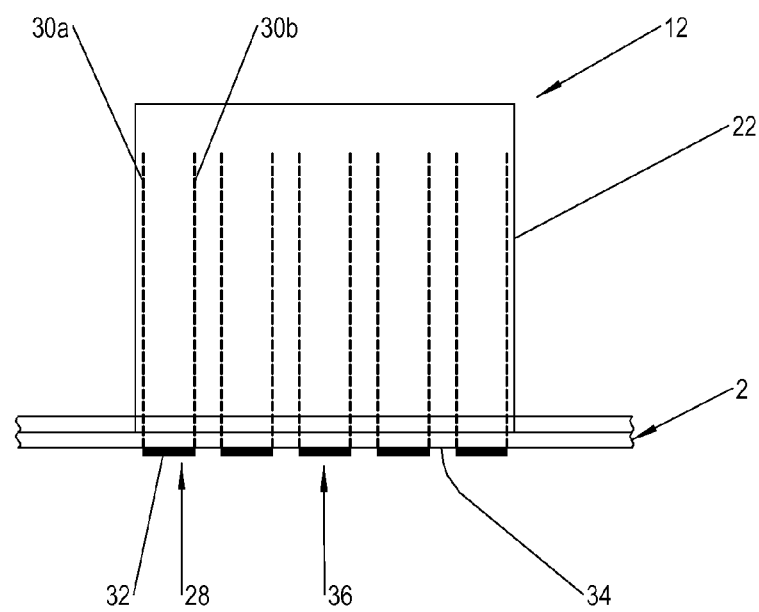
FIG. 6 is a front view of the segment in the area of a mount according to another embodiment of the invention.

In FIG. 6 an embodiment is shown, having U-shaped reinforcement elements 28, 36. Each U-shaped reinforcement elements 28, 36 has two parallel connection sections 30a, 30b and one blocking section 32 connecting the respective connection sections 30a, 30b with each other. The blocking sections 32 are in contact with the outer surface 34 of the skin field 2 and the connection sections 30a, 30b extend straight into a flange 22 of the mount 12. In the shown embodiment, the reinforcement elements 28 are rigid pins made from a metal such as titanium or from fiber-reinforced plastic materials such as CFRP.

Although it is not indicated in the figures due to illustrative reasons, the blocking sections 32, 38 ends flush with the outer skin 34 in order to avoid any aerodynamic turbulence.

Additionally in all embodiments, a not shown cover layer can be applied to the outer surface 34 of the skin field 2 in order to smoothing the skin field 2.

Disclosed is a segment, in particular for an aircraft, having a skin field and a stiffening structure for purposes of stiffening the skin field, wherein the skin field and the stiffening structure are made from fiber-reinforced plastic materials, and wherein the stiffening structure is bonded to an inner surface of the skin field and comprises a multiplicity of first stiffeners and a multiplicity of mounts which are formed integrally with the first stiffeners and which extend in the transverse of the first stiffener for the connection of second stiffeners to form an integral lattice structure, wherein a multiplicity of reinforcement elements for fixing the mounts mechanically to the skin field, each reinforcement element has a connection section and a blocking section having an extension in a direction inclined to the connection section, the connection section penetrates the skin field and the mounts, and the blocking section is in contact with an outer surface of the skin field, and a method for producing such a segment.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE LIST 1 segment/shell segment
2 skin field
4 stiffening structure
6 inner surface
8 stiffener/first stiffener
10 cross-ties
12 mount/clip
14 foot
16 foot
18 web
20 foot
22 flange
24 flange layer
26 flange layer
28 reinforcement element
30, 30a, 30b connection section
32 blocking section
34 outer surface
36 reinforcement element
38 blocking section
40 connection section
42 opposite surface
44 opposite surface
46 cutting line
48 narrow surface

The invention claimed is:

1. A shell segment of an aircraft, comprising:
a skin field,
a stiffening structure for purposes of stiffening the skin field,
wherein the skin field and the stiffening structure are made from fiber-reinforced plastic materials, and
wherein the stiffening structure is bonded to an inner surface of the skin field and comprises a multiplicity of first stiffeners and a multiplicity of mounts which are formed integrally with the first stiffeners and which extend in the transverse of the first stiffeners for the connection of second stiffeners, and
a multiplicity of reinforcement elements for fixing the mounts mechanically to the skin field,
wherein each mount comprises two flange layers, which are bonded together on their surfaces facing each other,
wherein each reinforcement element has a connection section and only one blocking section, the blocking section having an extension in a direction inclined to the connection section,
wherein each connection section penetrates the skin field and is inserted only between the surfaces of the flange layers of one of the mounts without penetrating into the flange layers, such that said connection section is in direct contact only with the surfaces of the respective flange layers facing each other, and
wherein the blocking section is in contact with an outer surface of the skin field.

2. The shell segment according to claim 1, wherein each reinforcement element has a pin-like shape with a shaft as a connecting section and a head as a blocking section.

3. The shell segment according to claim 2, wherein each blocking section is positioned in a recess of the outer surface of the skin field.

4. The shell segment according to claim 1, wherein each reinforcement element has a filament-like shape having a straight section as a connection section and an angled section as a blocking section.

5. The shell segment according to claim 4, wherein the reinforcement elements are positioned in crossed rows.

6. The shell segment according to claim 5, wherein the blocking sections of the crossed rows face away from each other.

7. The shell segment according to claim 1, wherein a cover layer is attached to the outer surface of the skin field.

8. A method for building a shell segment of an aircraft, with the steps:

manufacturing an integral stiffening structure from fiber-reinforced plastic materials, with a multiplicity of first stiffeners and integral mounts extending transverse to the first stiffeners for the connection of second stiffeners, each mount comprising two flange layers, which are bonded together on their surfaces facing each other, providing a skin field made from fiber-reinforced plastic materials, bonding the stiffening structure to an inner surface of the skin field to stiffen the skin field, and fixing the mounts to the skin field mechanically by reinforcement elements, wherein each reinforcement element has a connection section and only one blocking section, the blocking section having an extension in a direction inclined to the connection section, wherein each connection section of the reinforcement elements penetrates the skin field and is inserted only between the surfaces of the flange layers of one of the mounts without penetrating into the flange layers, such that said connection section is in direct contact only with the surfaces of the respective flange layers facing each other, and the blocking section is in contact with an outer surface of the skin field.

9. The method according to claim 8, wherein the reinforcement elements are inserted from the outer surface of the skin field.

10. The method according to claim 8, wherein the reinforcement elements are sewed, wherein filament loops on the outer surface of the skin field are created and are tilt against the outer surface.

* * * * *